United States Patent [19]
MacAdam

[11] 3,979,086
[45] Sept. 7, 1976

[54] ROCKETED DATA COMMUNICATION SYSTEM

[75] Inventor: James F. MacAdam, San Francisco, Calif.

[73] Assignee: The United States of America as represented by the Secretary of the Army, Washington, D.C.

[22] Filed: Nov. 8, 1974

[21] Appl. No.: 522,158

[52] U.S. Cl. ............................. 244/3.19; 343/6 A; 343/6 R
[51] Int. Cl.² .................... F42B 9/00; F41G 9/00
[58] Field of Search .................. 244/3.19, 3.15; 102/49.5, 49.4, 34.4; 343/6.5 R, 6 A

[56] References Cited
UNITED STATES PATENTS

| | | | |
|---|---|---|---|
| 3,124,072 | 3/1964 | Herrmann | 102/49.4 |
| 3,158,100 | 11/1964 | Finley | 102/49.4 |
| 3,200,402 | 8/1965 | Coleman et al. | 102/34.4 |
| 3,269,312 | 8/1966 | Fenton | 102/49.5 |
| 3,489,373 | 1/1970 | Parilla | 102/49.4 |
| 3,667,044 | 5/1972 | Vaughan et al. | 102/34.4 |
| 3,781,881 | 12/1973 | Hovey | 343/6.5 R |
| 3,846,797 | 11/1974 | Brown et al. | 343/6 A |

Primary Examiner—Samuel W. Engle
Assistant Examiner—Thomas H. Webb
Attorney, Agent, or Firm—Nathan Edelberg; Daniel Sharp; Sheldon Kanars

[57] ABSTRACT

A system for retrieving at a given station, either on the ground or in the air, data from a site on the earth's surface from which ground-based communication would be impracticable, either because of configuration of terrain or of the existence of intervening natural or man-made obstacles, wherein an assembly comprising a rocket module and a surface module connected together by an umbilical connector is emplaced directly or by air drop at the site and wherein the data is acquired at the site by sensors located within the surface module and recorded by a recorder located within the rocket module. Upon command from the given station, or after a predetermined time set by an electronic clock, the rocket module is launched into near space, and, upon attainment of an altitude at which suitable line-of-sight transmission of energy can be accomplished, a transmitter in the rocket module connected to the recorder is actuated, permitting the recorded data retrieved from the surface to be transmitted from the rocket module to the aforesaid station.

4 Claims, 2 Drawing Figures

ROCKETED DATA COMMUNICATION SYSTEM

SUMMARY OF THE INVENTION

A surface module, with attached rocket module, is placed directly at, or air dropped into, an enemy location from which data is desired. The data may, for example, consist of voice or radio communications, the presence of and signatures of enemy electronic non-communication equipment, infrared radiation, acoustic energy and the like which is indicative of the presence of, and activities of personnel, vehicles, and so forth. The surface module is attached to the rocket module by an umbilical connector by means of which necessary electrical connections are made with equipment in the rocket module and the necessary connections for actuating the rocket motor and controls. The data is acquired on the earth's surface in the vicinity of enemy operations by suitable sensors and associated amplifiers disposed in the surface module. The amplified sensor signals can be coupled by way of the umbilical connection between the surface module and the rocket module to an event/data recorder located within the rocket module. Some or all of the amplifiers alternatively may be located within the rocket module itself. The recorder can include a multi-track tape. A multiplexer can be used in the surface module-rocket assembly, with an associated demultiplexer being mounted at the remote station. The surface module contains a timing device to record the time that events or data are recorded. This timing device also can be used to initiate launching of the rocket module at a predetermined time after initial release at the data (enemy) location. Separate timing devices, however, can be used for the data time recording and rocket launching functions. Instead of timed launching, the rocket module can be launched in response to commands from the remote control station. The surface module also may include a special sensing device which, in response to close approach of personnel or vehicles, as evidenced, for example, by signals of greater than a predetermined amplitude, would trigger the launching means immediately. The surface module can be self-destructed after the launching of the rocket module has been accomplished.

The rocket module, in addition to carrying the recorder and the necessary rocket igniter, motor and controls, includes a radio transmitter with modulator and antenna coupled to the recorder and a device to initiate radio transmission of the recorded data at some predetermined altitude. The rocket module may further include an explosive device to destruct the latter upon completion of all essential data transmission.

In contrast with conventional telemetering systems, wherein one acquires data concerning an atmospheric environment through which the radio-sonde or data acquisition means passes, or to systems wherein the data is acquired in earth orbit, as in satellite-carried acquisition and recovery systems, applicant's system acquires data on the surface in the immediate vicinity of the enemy. The data so acquired in applicant's system is transmitted from a relatively low altitude (near space) contained by the rocket-boosted rocket module, rather than from earth orbit, and in satellite data systems, thereby facilitating data communications between the telemetering source and the remote receiving location at the surface. While the subject data retrieval system can be used for data recovery in several situations, including those involving remote unattended ground-base sensors, military field operations and covert intelligent operations, it is uniquely applicable to sites from which data recovery by conventional means is difficult, if not impossible.

SPECIFIC EMBODIMENT OF THE INVENTION

Figure 1:
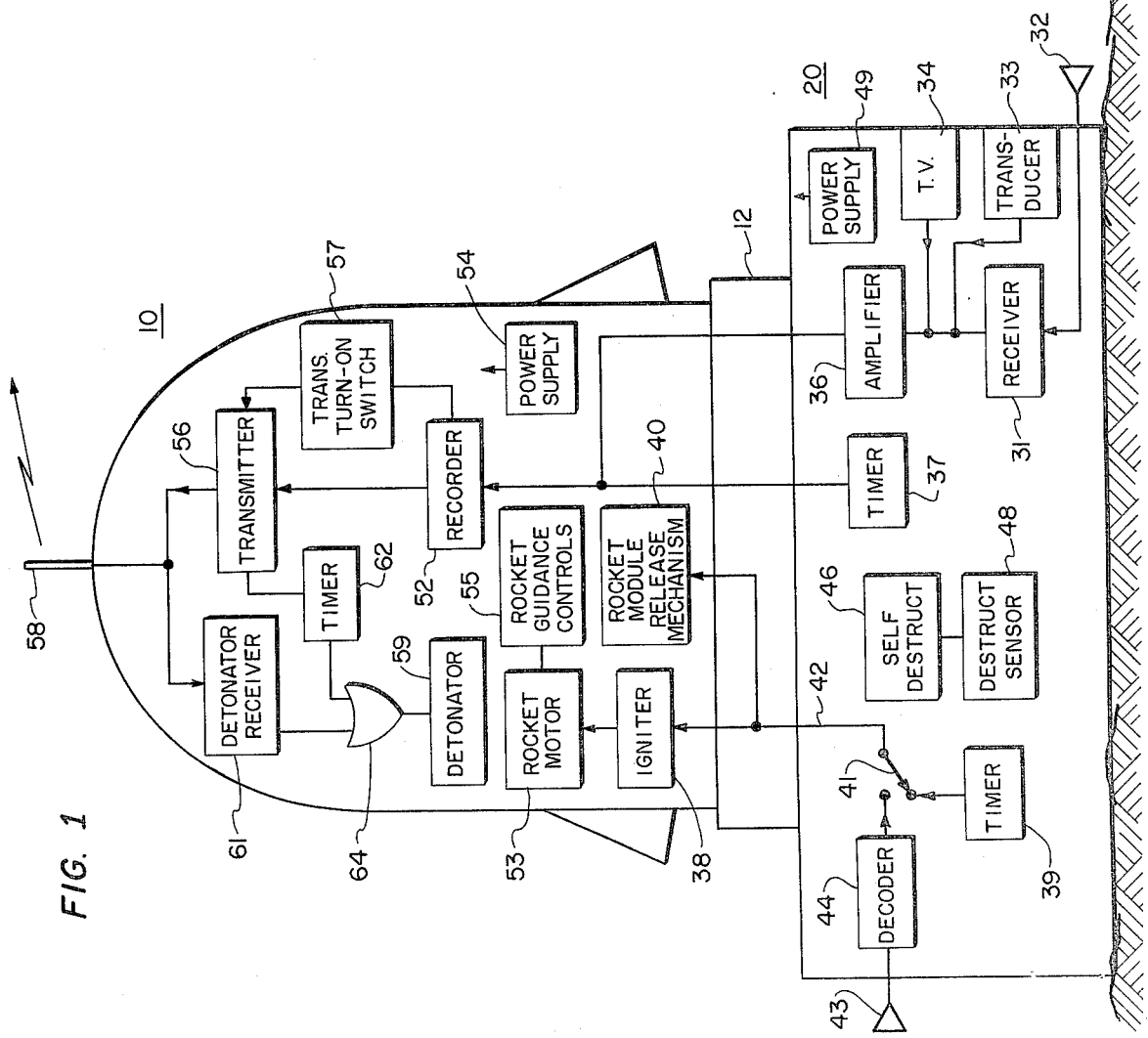
FIG. 1 is a schematic view illustrating a data retrieval system according to the invention including a rocket module umbilically connected to a surface module and emplaced on a region of the earth surface from which data is to be acquired, together with the associated remote control and receiving station.

Referring to the drawing, FIG. 1 illustrates a rocket module 10 and a surface module 20 which are joined together initially by an umbilical connector 12. This module assembly 10, 12, 20 is emplaced directly at, or air-dropped by parachute onto, a region on the earth's surface from which it is desired to obtain information on enemy personnel or vehicular movements, enemy voice or radio communications, and the presence of other electronic equipment. The module assembly is so constructed as to have stable orientation while on the surface. Although not shown in FIG. 1, the surface module 20 could include a tripod mounting assembly for supporting the module assembly on the ground. The surface module 20 includes one or more sensors which may be of various types. For example, a wideband radio receiver 31 including a receiving antenna 32 serves to receive radio communications from the enemy. One or more transducers 33 for converting sound and infrared energy into electrical energy also can be included in the surface module. The infrared detectors could be used to detect the presence of personnel, vehicles or other heat generating sources not only during the day, but also at night. It is obvious that many available sensors can be provided within the surface module 20 to respond to particular sources of information in the area adjacent to the module. For example, one or more television cameras 34 and associated television equipment also could be mounted aong the periphery of the surface module 20 to view the surrounding territory. The incoming data, after conversion into suitable electrical form, in a manner well known in the art, can be amplified by amplifiers 36 located either in the surface module itself, as indicated in FIG. 1, or in the rocket module 10. In either event, the electrical signals are supplied to recorder means 52 within the rocket module 10 by way of connections in the umbilical connector 12. The time that various events or data are received can be recorded by means of a timing device 37 within the surface module; the output of this timing device can be connected to the recorder 52 through the umbilical connector 12. The rocket module 10 includes a rocket motor 53 with appropriate guidance controls 55, a rocket igniter 38, and a rocket module release mechanism 40.

Initiation of launch of the rocket module into near space can be achieved in two ways. First, the rocket motor 53 can be triggered into operation by a clock signal from timer 39 (see position of contact of switch 41 and FIG. 1) applied to rocket igniter 38 via umbilical connection 42 in the umbilical connector 12 at a predetermined time interval which can be reckoned from the time the module assembly is emplaced on the ground or which may expire after a period sufficient to collect a reasonable amount of information. Alternatively, the rocket motor 38 can be fired in response to a signal of particular format from the remote control and receiving station 15; for example, a coded signal from the remote station 15, upon receipt by antenna means 43 in the surface module 20, can be decoded by decoder 44 and applied via switch 41 and the umbilical connection 42 in the rocket module 10. In actual practice, the switch 41 preferably would be replaced by some logic circuitry which would permit alternative connection of the decoder output or the timer output to the rocket igniter 38 in response to control from the remote station.

The rocket module further includes a rocket release mechanism 40 which is actuated in response to the signal on umbilical connector 42 to release or unlatch the rocket module 10 from the surface module 20.

Figure 2:
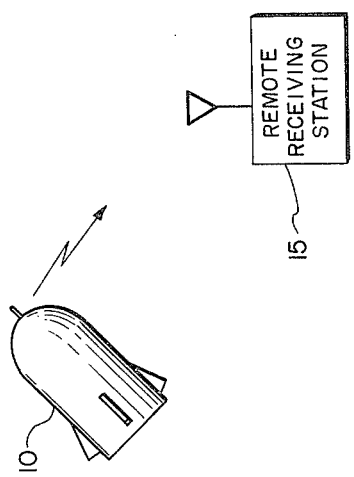
FIG. 2 is a schematic view illustrating the data retrieval system of the invention during actual rocket-borne transmission of data previously acquired on the earth's surface.

The surface module 20 can further include a self-destruct means 46 sensitive to mechanical vibrations resulting from actual contact by enemy personnel, equipment or weapon fire, or from sensing of the presence of suitable signals by appropriate destruct sensing means 48. Alternatively, the self-destruct means 46 can be configured to permit launching of the rocket module 10 with whatever data has been received and then to self-destruct the surface module only. Suitable power supplies 49 and 54 for all components in the respective rocket and surface modules also must be included. In response to the rocket firing signal applied to the rocket igniter 38 and rocket module release mechanism 40, module 20, the rocket motor 53 of rocket module 10 is ignited and the rocket module is launched from the surface module and separates from the umbilical connector 12. The rocket module 10, having been launched into free space, is shown in FIG. 2. The output of the recorder 52 is supplied to the modulator portion of the transmitter 56 in the rocket module. When the rocket module has attained the proper altitude, which may be in the order of 10,000 feet, a pressure-actuated switch 57 closes and turns on transmitter 56. The latter now transmits the recorded data from the recorder 52 by way of antenna 58 which protrudes slightly from the rocket module housing. At the height selected for transmission, high frequency, straight-line data communicated between the transmitter 56 and the remote receiving station 15 can be easily effected. This data received by the remote station 15 is processed in the usual manner to provide information concerning the region from which the rocket module was launched into space.

The rocket module 10 can be destroyed by a detonator 59 actuated in one of two ways. When a suitable detonator control signal from the remote station 15 is received over antenna 58 by the detonator receiver 61, the output thereon is supplied to the detonator 59 to destruct the rocket module 10. The detonator 59 can be actuated in response to a signal from a timer 62 which is connected to transmitter 56 and starts operation upon turning on of the transmitter, viz., upon closure of switch 57. This timer produces an electrical output after a preset time sufficient to allow transmission of all necessary data. The detonator receiver 61 and timer 62 can be connected to the detonator 59 by way of the OR circuit 64.

What is claimed is:

1. A data retrieval system for obtaining information emanating from a hostile region on the earth's surface comprising:

an information receiving station remote from said hostile region, a rocket module, a surface module and an umbilical connector initially interconnecting said rocket module and said surface module for emplacement at the aforesaid region, sensor means within said surface module for receiving said information and for converting that information into information signals of suitable electrical form, recording means within said rocket module receptive of said electrical signals and connected originally through said umbilical connector to said sensor means for recording said electrical information signals, said rocket module including a transmitter, a rocket motor having associated ignition and guidance means, and a rocket module release mechanism, means within said surface module for igniting said rocket motor and activating said release mechanism in response to a control signal to launch into near space only said rocket module, and means responsive to attainment of an altitude above the earth's surface suitable for straight line transmission to said remote control station for activating said transmitter to transmit said control station the recorded information from said recording means.

2. A data retrieval system according to claim 1 wherein said station includes means for transmitting said control signal and said surface module includes means for receiving said transmitted control signal.

3. A data retrieval system according to claim 1 wherein said surface module includes timing means set for a predetermined time sufficient to obtain necessary information from said hostile region for generating said control signal.

4. A data retrieval system according to claim 2 wherein said transmitted control signal is a coded signal and wherein said rocket module includes a decoder responsive to said coded signal and coupled to said rocket motor initiation and guiding control means.

* * * * *